Dec. 24, 1963   S. M. KULUSIC   3,115,065
MASTER ARBOR FOR MILLING MACHINES
Filed Dec. 13, 1961
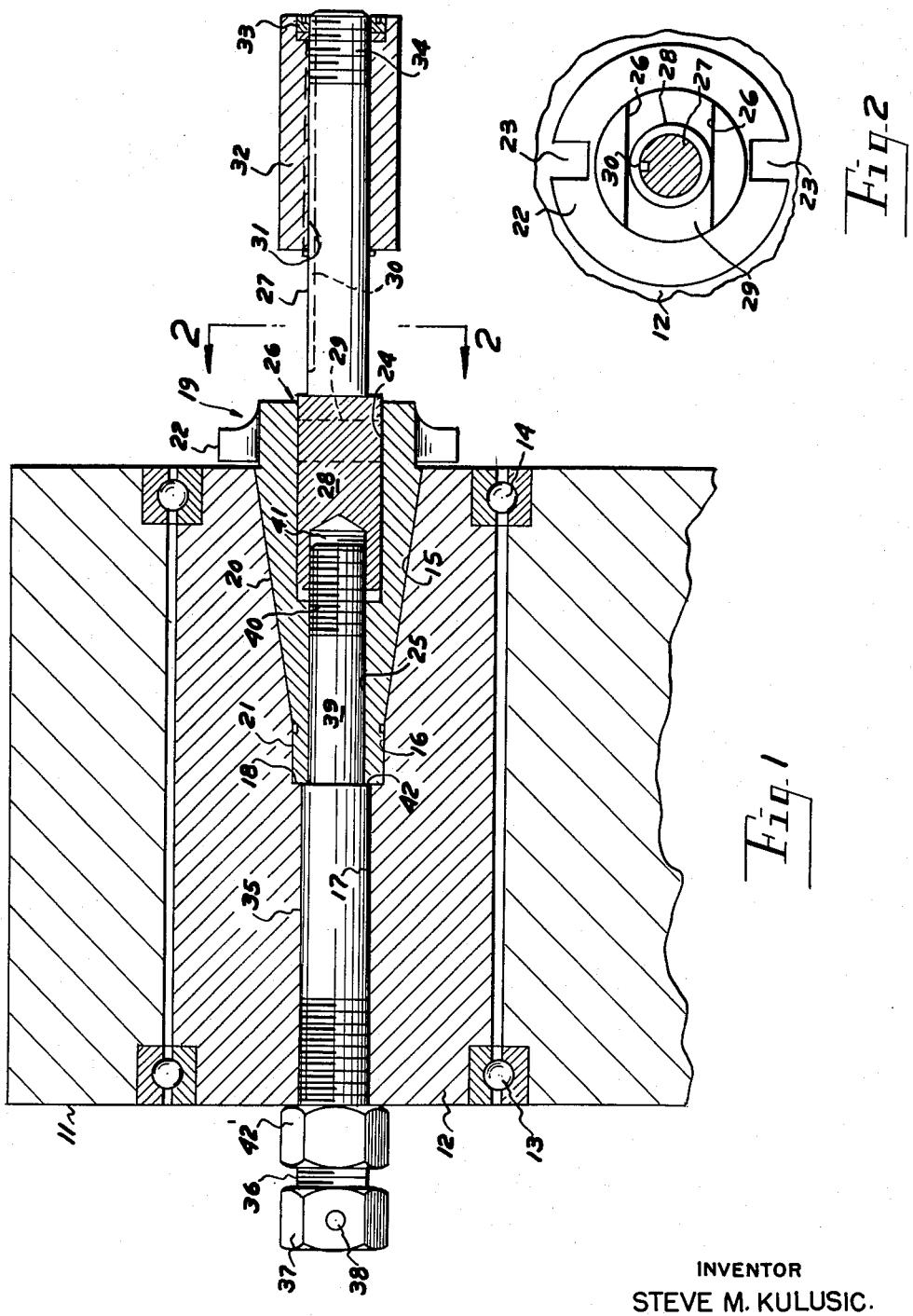
INVENTOR
STEVE M. KULUSIC.
BY *Robert A. Sloman*
ATTORNEY.

United States Patent Office 3,115,065
Patented Dec. 24, 1963

3,115,065
MASTER ARBOR FOR MILLING MACHINES
Steve M. Kulusic, 25450 Ryan Road, Warren, Mich.
Filed Dec. 13, 1961, Ser. No. 159,046
2 Claims. (Cl. 90—11)

This invention relates to a master arbor construction for use in connection with the power driven spindle of a milling machine, and more particularly to a novel form of master arbor and associated interchangeable tool arbor.

Heretofore in milling machines of this type it was necessary to change and replace the master arbor each time a different sized milling tool was required. Oftentimes the master arbor could be used for several sizes of milling tool, but beyond a very limited range, it was necessary to disassociate the master arbor from the milling machine spindle to accommodate a reasonable range of milling tools. Thus the tool arbor was frequently changed.

It is a primary object of the present invention to incorporate in conjunction with the power driven spindle of a milling machine, a master arbor which once assembled within the said spindle remains therein and is so constructed as to removably and interchangeably receive tool arbors of different sizes.

It is the object of the present invention to provide a novel form of master arbor with a means for cooperatively and interchangeably receiving and mounting tool arbors bearing different milling tool sizes and with means employed in conjunction with the master arbor for securing the master arbor in position and at the same time to retain the tool arbor with respect to the master arbor.

These and other objects will be seen from the following specification and claims in conjunction with the appended drawing in which:

FIG. 1 is a fragmentary longitudinal section of a portion of a milling machine showing the spindle, the master arbor and interchangeable tool arbor.

FIG. 2 is a fragmentary section taken on line 2—2 of FIG. 1.

It will be understood that the above drawing illustrates merely a preferred embodiment of the invention and that other embodiments are contemplated within the scope of the claims hereinafter set forth.

Referring to the drawing, the housing of a milling machine is fragmentarily indicated at 11 and suitably journaled therein relative to the bearings 13 and 14 is a conventional type of power driven spindle 12, said spindle having a tapered bore 15 terminating in axial bore 16 and the additional axial bore 17, as best illustrated in FIG. 1.

The spindle bore 16 being larger than spindle bore 17, there is defined therebetween an inner retaining stop 18 which supportedly engages the inner end portion of the master arbor 19, and serves as a stop for said master arbor.

The said master arbor, generally indicated at 19, is exteriorly tapered at 20 towards its rear end. This exterior taper terminates in a cylindrical portion 21 which cooperatively nests within bore 16 of the spindle 12, whereas the tapered wall portion 20 of said master arbor registers with the tapered bore 15 in said spindle.

In this connection, it is noted also that the master arbor 19 projects outwardly of the spindle as best shown in FIG. 1, and includes a corresponding form of mounting disc 22 transversely apertured at the top and bottom as at 23, FIG. 2, adapted to normally receive a locking key.

Master arbor 19 includes an inner first bore 24, which extends inwardly from the outer end of the said master arbor and is in communication with the counterbore 25 of reduced diameter, which extends to the opposite end of the said master arbor.

The outer end face of master arbor 19 adjacent its axial bore 24 is transversely slotted at 26 in order to cooperatively receive in interlocking relation a conventional form of transverse key 29 forming a part of the removable and interchangeable arbor 27 as hereinafter described.

The interchangeable tool arbor 27 has an elongated shank adapted to removably mount a milling tool or cutting tool 32 as hereinafter described, and at its opposite end includes a cylindrical body 28 of increased dimension, which is removably nested within bore 24 for operative engagement with the master arbor.

Transversely extending key 29 on the arbor 27 is retainingly nested within the transverse slot 26 in the end face portion of the master arbor 19.

The shank for the arbor 27 has a keyway slot, the outer surface thereof adapted to receive the key 31, which forms a part of or extends into the removable milling tool 32 and which is fixedly secured over the threaded end 34 of arbor 27, as by the spanner type of fastener 33 with a suitable lock washer interposed, being a conventional type of construction, said keyway being designated at 30, FIG. 1.

An elongated drawbar 35 is movably nested within the bore 17 of spindle 12, and extends through the first bore 25 in master arbor 19 and has a reduced diameter portion 39, which at threaded end 40 extends into the internally threaded bore 41, in the body 28 of the tool arbor 27, as best shown in FIG. 1.

Reduced diameter portion 39 of the drawbar 35 thus defines therein the shoulder stop 42 which registers with an end portion of the master arbor 19 for limiting relative inward movement of the said drawbar with respect to the said master arbor.

A means is mounted on the outer end of drawbar 35 for rotating the same. For this purpose there is provided a nut 37, which is threaded or otherwise mounted over the end of said drawbar and fixedly secured thereto as by the transverse pin 38.

A locking means is adjustably threaded on the said drawbar adapted for operative engagement with spindle 12 for the purpose of securing the arbor 27 within the master arbor 19 and for the further purpose of securing the master arbor 19 within the spindle 12.

For this purpose there is employed upon the threaded portion 36 of drawbar 35, an adjustable nut 42, which is manually roated as by a wrench or other means for drawing up the said drawbar, as hereinafter explained.

In the operation of the present device the threaded end 40 of the drawbar 35 is threaded into the threaded bore 41 of the arbor 27 by rotation of the nut 37 and the drawbar 35 fixedly connected thereto. This will cause an inward positioning of body 28 of the arbor 27 within the bore 24 of the master arbor until such time as the transverse key 29 operatively and retainingly engages the said master arbor 19 within the transverse slot 26 formed in the end face thereof.

This has the result therefore of initially drawing up the arbor 27 tightly within the master arbor 19. Additionally, however, in order to tighten the assembly, the manually adjustable nut 42 is rotated into operative frictional engagement with the spindle 12, which has the effect further of drawing up the master arbor 19 snugly and tightly within the bores 15 and 16 within spindle 12, completing the assembly.

The stop shoulder 18 provided within the spindle 12 provides a means which limits the inward positioning of the master arbor 19. The purpose of this is to prevent the master arbor from being drawn so tightly into the spindle as to render it difficult to remove the same should it be desired. It also serves as a positive stop for the purpose of fixedly securing the master arbor in position upon the tightening of the fastener nut 42. This tightening of the nut 32 has the effect of moving the drawbar inwardly and the inward retaining force is transmitted through the key 29 of the arbor 27 to the end face portion of the master arbor 19 through the slotted portion 26, shown in FIG. 2.

By the present construction, should it be desired to employ a milling tool 32 of a diameter different from the milling tool shown in FIG. 1, under the present construction it is not necessary to remove the master arbor 19, but only remove the interchangeable tool arbor 27 and replace it with another tool arbor, which accommodates a milling tool of a different dimension.

In every case, the replaceable and interchangeable arbor 27 will have a body 28 of a diameter so as to snugly and cooperatively nest within the bore 24 of the master arbor 19. By this construction, a large range of diameters of milling tools may be employed mounted upon replaceable and interchangeable arbors 27 but employing the same master arbor 19 to thus achieve the objects and purposes of the invention, as above set forth.

Having described my invention, reference should now be had to the following claims.

I claim:

1. In a milling machine with a power driven spindle having therethrough a tapered bore terminating in an axial bore, an exteriorly tapered master arbor nested in said tapered bore and projecting from the spindle, said master arbor terminating in a cylindrical portion nested in said axial bore and including an inner first bore extending from one end thereof and a communicating counterbore extending from its other end; the improvement comprising an easily removable and interchangeable tool arbor having an elongated shank adapted to removably mount a cutting tool thereon and a cylindrical body at one end of said shank, removably nested within said counter bore spaced from its inner end operatively engaging the master arbor and including an axial internally threaded bore communicating with the master arbor first bore, a drawbar projected through the axial bore of said spindle, through the first bore of said master arbor and at one end threaded into the bore of said arbor body, the other end of said drawbar being threaded and projected outwardly of said spindle, a locking nut adjustably threaded on said drawbar operatively engageable with said spindle for removably securing said tool arbor within said master arbor and for removably securing said master arbor within said spindle, and means interlocking said tool arbor and master arbor, said spindle bores defining in said spindle an inner retaining stop, said master arbor cylindrical portion cooperatively bearing against said stop limiting inward movement of the master arbor relative to the spindle and limiting frictional engagement of the master arbor with the spindle, the said other end of said drawbar being of greater diameter than the inner end of said drawbar defining a stop shoulder operatively engaging the inner end of the master arbor in end to end axial registry, the means interlocking said tool arbor and master arbor including a transverse slot in one of said two latter arbors and a transversely extending key in the other of said two arbors, said interlocking means providing the above recited operative engagement between said master arbor and tool arbor, said tool arbor on mere loosening of the drawbar being removable and interchangeable with other tool arbors having different diameter shanks to accommodate different sized milling tools, all said tool arbors having the same body diameter.

2. In the milling machine structure defined in claim 1, a second nut mounted over the outer end of said draw bar spaced from said first nut providing a means of rotating the draw bar, and a transverse pin extending through the second nut and draw bar for immovably securing the second nut thereon.

References Cited in the file of this patent

UNITED STATES PATENTS

| | | |
|---|---|---|
| 1,794,361 | Armitage et al. | Mar. 3, 1931 |
| 2,111,067 | Hedgepeth | Mar. 15, 1938 |